(12) United States Patent
Tejomurtula et al.

(10) Patent No.: US 9,979,587 B2
(45) Date of Patent: May 22, 2018

(54) METHOD AND SYSTEM FOR SEMI-SYNCHRONOUSLY EXPORTING DATA

(71) Applicant: salesforce.com, inc., San Francisco, CA (US)

(72) Inventors: Venkata Muralidhar Tejomurtula, Danville, CA (US); Oleksii Kolesnik, Foster City, CA (US); Pawan Nachnani, Newark, CA (US); Cassandra Funk, Chicago, IL (US); MaryAnn Patel, San Francisco, CA (US); Atul Singh, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 556 days.

(21) Appl. No.: 13/862,193

(22) Filed: Apr. 12, 2013

(65) Prior Publication Data

US 2013/0339490 A1 Dec. 19, 2013

Related U.S. Application Data

(60) Provisional application No. 61/661,408, filed on Jun. 19, 2012.

(51) Int. Cl.
*G06F 15/16* (2006.01)
*H04L 29/08* (2006.01)

(52) U.S. Cl.
CPC ........ *H04L 29/08117* (2013.01); *H04L 67/06* (2013.01); *H04L 67/1095* (2013.01)

(58) Field of Classification Search
CPC ........ G06Q 20/04; G06Q 20/12; G06F 21/10; G06F 21/57
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

OTHER PUBLICATIONS

U.S. Appl. No. 13/986,251, dated Apr. 16, 2013.

*Primary Examiner* — Brian Whipple
*Assistant Examiner* — Anthony T Rotolo
(74) *Attorney, Agent, or Firm* — Dergosits & Noah LLP; Todd A. Noah

(57) ABSTRACT

Systems and methods are provided for semi-synchronously exporting data. A web server creates an export record in response to receiving a data request from a client computer. The web server sends a token to the client computer, wherein receipt of the token enables the client computer to be used for other purposes while waiting for receipt of requested data. At least one of multiple batch processing servers processes the data request in response to accessing the export record. At least one of the multiple batch processing servers updates the export record to reflect the processing of the data request. The web server exports the processed data request to the client computer in response to identifying an update of the export record.

20 Claims, 4 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,108,346 A * | 8/2000 | Doucette | H04L 12/433 370/353 |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0031230 A1* | 3/2002 | Sweet et al. | 380/278 |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0133412 A1* | 9/2002 | Oliver et al. | 705/26 |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2002/0174421 A1* | 11/2002 | Zhao | H04L 67/02 717/174 |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0038724 A1* | 2/2005 | Roever et al. | 705/35 |
| 2005/0050555 A1 | 3/2005 | Exley et al. | |
| 2005/0091098 A1 | 4/2005 | Brodersen et al. | |
| 2007/0100746 A1* | 5/2007 | Blair et al. | 705/39 |
| 2008/0189350 A1* | 8/2008 | Vasa | H04L 12/2602 709/201 |
| 2009/0063415 A1 | 3/2009 | Chatfield et al. | |
| 2009/0100342 A1 | 4/2009 | Rueben et al. | |
| 2009/0177744 A1 | 7/2009 | Marlow et al. | |
| 2012/0144054 A1* | 6/2012 | Van Velzen | G06F 17/3089 709/231 |
| 2012/0233137 A1 | 9/2012 | Jakobson et al. | |
| 2012/0254484 A1* | 10/2012 | Yang | G06F 9/545 710/47 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |

\* cited by examiner

METHOD AND SYSTEM FOR SEMI-SYNCHRONOUSLY EXPORTING DATA

CLAIM OF PRIORITY

This application claims the benefit of U.S. Provisional Patent Application 61/661,408 entitled SYSTEM AND METHOD FOR SEMI-SYNCHRONOUSLY EXPORTING DATA, by Tejomurtula, et al., filed Jun. 19, 2012 , the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SEMI-SYNCHRONOUSLY EXPORTING DATA

One or more implementations relate generally to semi-synchronously exporting data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Typically, data may be transmitted in a synchronous or an asynchronous manner, such as from a web server to a client. Synchronous communication is the transmission of data in a steady stream, whereas asynchronous communication is the intermittent transmission of data. While each type of transmission has uses and benefits, it is desirable to provide techniques that improve the performance, efficiency, and the ease of use for transmitting data, such as from a web server to a client.

BRIEF SUMMARY

In accordance with embodiments, there are provided systems and methods for semi-synchronously exporting data. A web server creates an export record in response to receiving a data request from a client computer. For example, a web server creates an export record after receiving a request for data for 6,654 San Francisco sales manager contacts from a client computer. The web server sends a token to the client computer, wherein receipt of the token enables the client computer to be used for other purposes while waiting for receipt of requested data. For example, the web server synchronously sends a token to the client computer that enables the client computer to be used for other purposes while waiting in background for data for the 6,654 contacts. At least one of multiple batch processing servers processes the data request in response to accessing the export record. For example, two batch processing servers access the export record and process the request for the data for the 6,654 contacts. At least one of the multiple batch processing servers updates the export record to reflect the processing of the data request. For example, the two batch processing servers update the export record to reflect that the request for the data for the 6,654 contacts has been processed. The web server exports the processed data request to the client computer in response to identifying an update of the export record. For example, the web server identifies the update to the export record, and asynchronously exports the data for the 6,654 contacts to the client computer. Accordingly, systems and methods are provided which enable a database system to semi-synchronously export data.

While one or more implementations and techniques are described with reference to an embodiment in which semi-synchronously exporting data is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for semi-synchronously exporting data.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for semi-synchronously exporting data will be described with reference to example embodiments.

The following detailed description will first describe a method for semi-synchronously exporting data.

Next, an example of a system for semi-synchronously exporting data is described.

Figure 1:
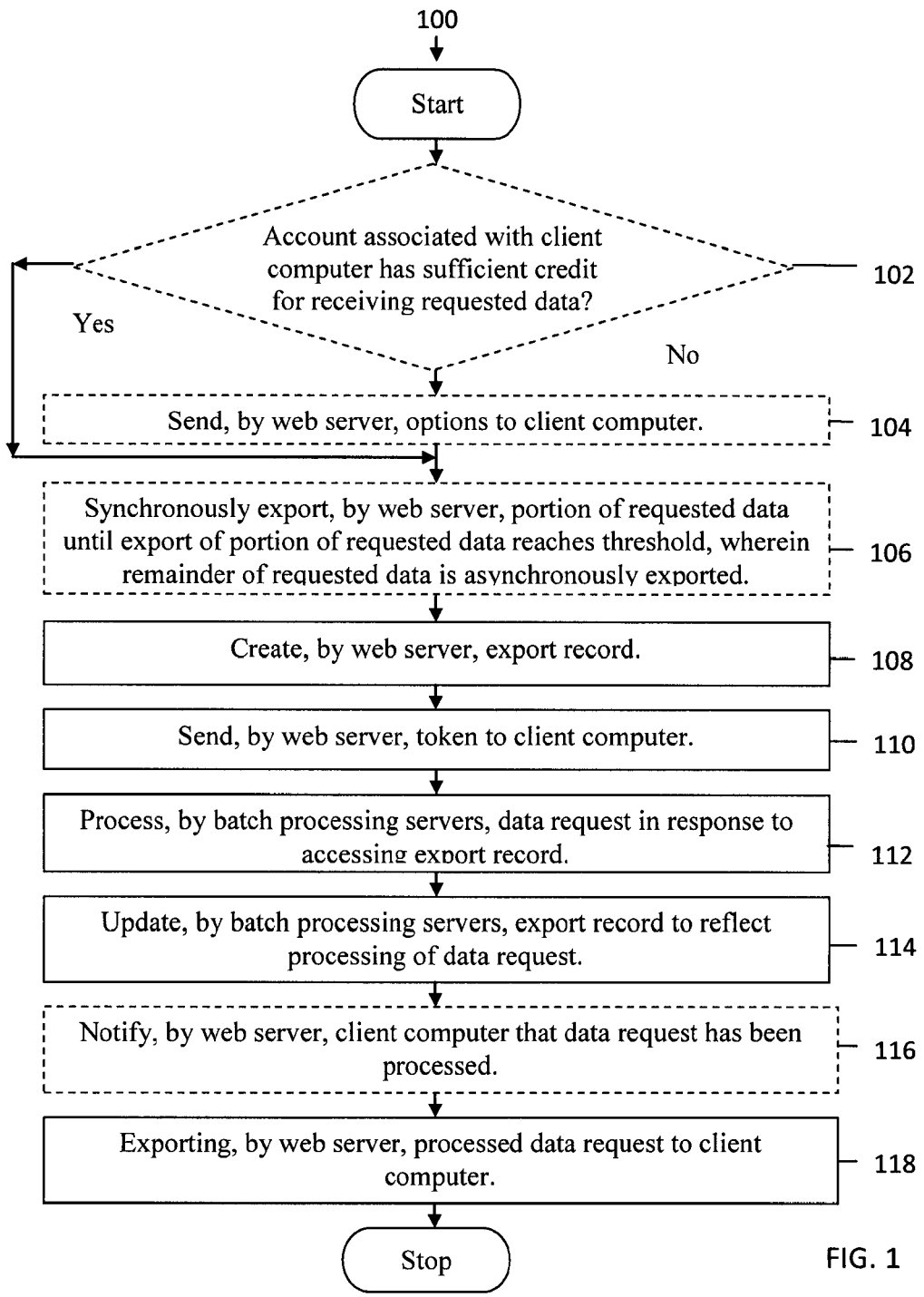
FIG. 1 is an operational flow diagram illustrating a high level overview of a method for semi-synchronously exporting data in an embodiment.

FIG. 1 is an operational flow diagram illustrating a high level overview of a method 100 for semi-synchronously exporting data. As shown in FIG. 1, a database system can semi-synchronously export data from a web server to a client.

In block 102, a determination is optionally made whether an account associated with a client computer has sufficient credit for receiving requested data. For example and without limitation, this can include a web server determining whether a user's account has sufficient credit for receiving the data for the 6,654 contacts identified and subsequently requested after a client computer searched for the terms "San Francisco sales manager." Credit may be in the form of cash remuneration, points, virtual currency, etc. This verification ensures that a customer provides payment for rendered services. If the account does not have sufficient credit for receiving the requested data, the method 100 continues to block 104. If the account has sufficient credit for receiving requested data, the method 100 proceeds to block 106.

In block 104, options are optionally a sent by a web server to a client computer. By way of example and without limitation, this can include a web server sending options to a client computer, wherein the options include adding all of the 6,654 requested contacts to a cart for later use, using available credit to purchase 1,000 of the 6,654 requested contacts, modifying the data request to request only a subset of the 6,654 requested contacts, or selecting from other options. The user of the client computer learns immediately after the data request that the user's account currently has insufficient credit to fulfill this request, instead of the user making the data request, continuing to believe that the user's account has sufficient credit to fulfill the request, and only learning of the credit insufficiency after a significant period of time, when the all of the data request has been fully processed. Prompt notification of the user of any account credit insufficiency may reduce user frustration and improve the user experience.

In block 106, a portion of requested data is optionally synchronously exported by a web server until the export of the portion of the requested data reaches a threshold, wherein a remainder of the requested data is asynchronously exported. In embodiments, this can include the web server synchronously exporting the data for 50 of the 6,654 requested contacts during a "synchronous window" time period, wherein the web server subsequently asynchronously exports the data for the remaining 6,604 contacts. While a portion of the data export process may be synchronous, and a portion may be asynchronous, the data export experience may appear synchronous to the user of the client computer.

In block 108, a web server creates an export record. For example and without limitation, this can include a web server creating an export record after receiving a request for the data for 6,654 San Francisco sales manager contacts from a client computer. If the webserver had to fully process the request for data in a database before responding to the client computer, and the request was for thousands or millions of records, the web server may not be able to promptly respond to requests from other client computers. Furthermore, the user of the client computer may become frustrated due to waiting a significant amount of time to receive the thousands or millions of records while being unable to use the client computer for any other purposes. Additionally, a web server continually processing a request for millions of records from a database may be an inefficient use of the database, which may result in "locking out" other servers that are attempting to access the database.

In block 110, a web server sends a token to a client computer. By way of example and without limitation, this can include a web server sending an export token to a client computer that enables the client computer to be used for other purposes while waiting in background for the data for 6,654 requested contacts, which may significantly improve the user experience.

In block 112, at least one of multiple batch processing servers processes a data request in response to accessing an export record. In embodiments, this can include two batch processing servers accessing an export record and processing the request for the data for 6,654 requested contacts.

In block 114, at least one of multiple batch processing servers updates an export record to reflect the processing of a data request. For example and without limitation, this can include two batch processing servers updating an export record to reflect that a request for the data for 6,654 requested contacts has been processed.

In block 116, a web server optionally notifies a client computer that a data request has been processed. By way of example and without limitation, this can include a web server notifying a client computer that a data request for 6,654 requested contacts has been processed. Such a notification can alert the user of the client computer that the receipt process of the requested data is about to begin, which may enable the user to plan the most efficient use of the client computer accordingly. In this fashion, the web server may keep the client computer up to date on the status of the export record, which the web server may initially handle in a synchronous-like fashion, but then apportion to one or more of the batch processing servers in an asynchronous-like fashion.

In block 118, a web server exports a processed data request to a client computer in response to identifying an update of an export record. In embodiments, this can include a web server identifying an update to an export record, and asynchronously exporting the data for 6,654 requested contacts to a client computer.

The method 100 may be repeated as desired. Although this disclosure describes the blocks 102-118 executing in a particular order, the blocks 102-118 may be executed in a different order.

Figure 2:
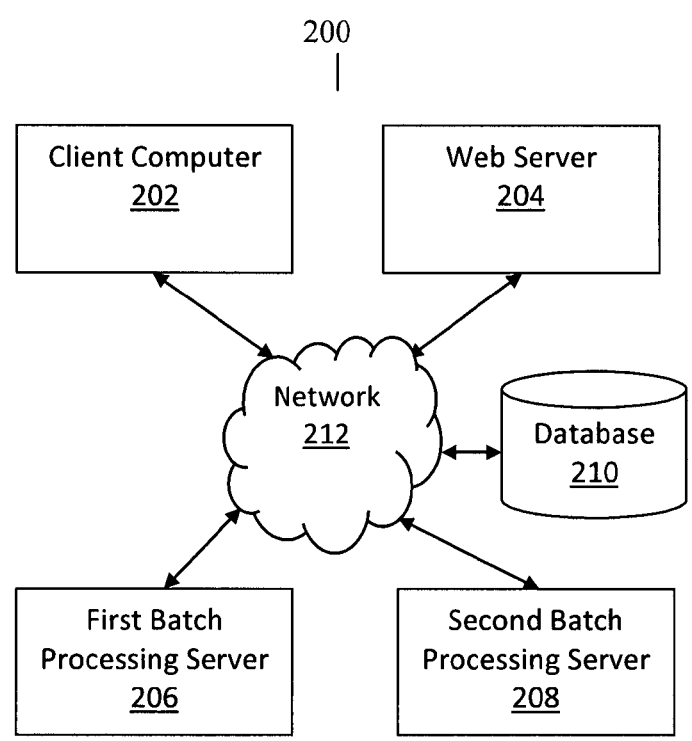
FIG. 2 illustrates a block diagram of an example of a system for semi-synchronously exporting data.

FIG. 2 illustrates a block diagram of an example system that provides semi-synchronously exporting data. As shown in FIG. 2, a system 200 may illustrate a cloud computing environment in which data, applications, services, and other resources are stored and delivered through shared datacenters and appear as a single point of access for the users. The system 200 may also represent any other type of distributed computer network environment in which servers control the storage and distribution of data for different client users. In an embodiment, the system 200 represents a cloud computing system that includes a client computer 202, a web server 204, a first batch processing server 206, a second batch processing server 208, and a database 210 that communicate via a network 212. Although FIG. 2 depicts the system 200 with one client computer 202, three servers 204-208, one database 210, and one network 212, the system 200 may include any number of client computers 202, any number of servers 204-208, any number of databases 210, and any number of networks 212. The client computer 202, which may be part of a mobile computing device, enables a user to communicate with the server 204 in a distributed system.

The web server 204 creates an export record in response to receiving a data request from the client computer 202. The client computer 202 may be any computing device capable of communicating with and receiving data from the web server 204, or any computer connected to such a client computer 202. The web server 204 may be thin, with minimal processing to verify export completion during a synchronous window. The web server 204 sends a token to the client computer 202, which the client computer 202 may use for polling the web server 204 to determine when the request for data has been fully processed. Receipt of the token notifies the client computer 202 that the request will be fulfilled asynchronously, enabling the client computer 202 to be used for other purposes while waiting in background for the receipt of the requested data. One or more of the batch processing servers 206-208 pick up the export record from the database 210 for processing. The one or more of the batch processing servers 206-208 may asynchronously handle the back-end "heavy lifting" of accessing the database 210 and preparing the response to the request for data from the client computer 202. After fully processing the export record, the one or more of the batch processing servers 206-208 updates the export record. In the meantime, the client computer 202 may execute a process in background to periodically poll the web server 204 to determine if the processing of the data request has been completed. Such polling may enable the user of the client computer 202 to plan the most efficient use of the client computer 202. The web server 204 checks the export record for completion, notifies the client computer 202 once the export record processing has been completed, and conveys the requested data to the client computer 202. This process achieves semi-synchronous export of data while reducing the load on the client computer 202, the web server 204, the batch processing servers 206-208, and the database 210.

These examples illustrate the export of contact records from an online web server, but the processes disclosed herein may be applied to all types of data and/or data objects. Semi-synchronous data transfer enables resources to be allocated accordingly, reducing load across all servers in a distributed environment.

System Overview

Figure 3:
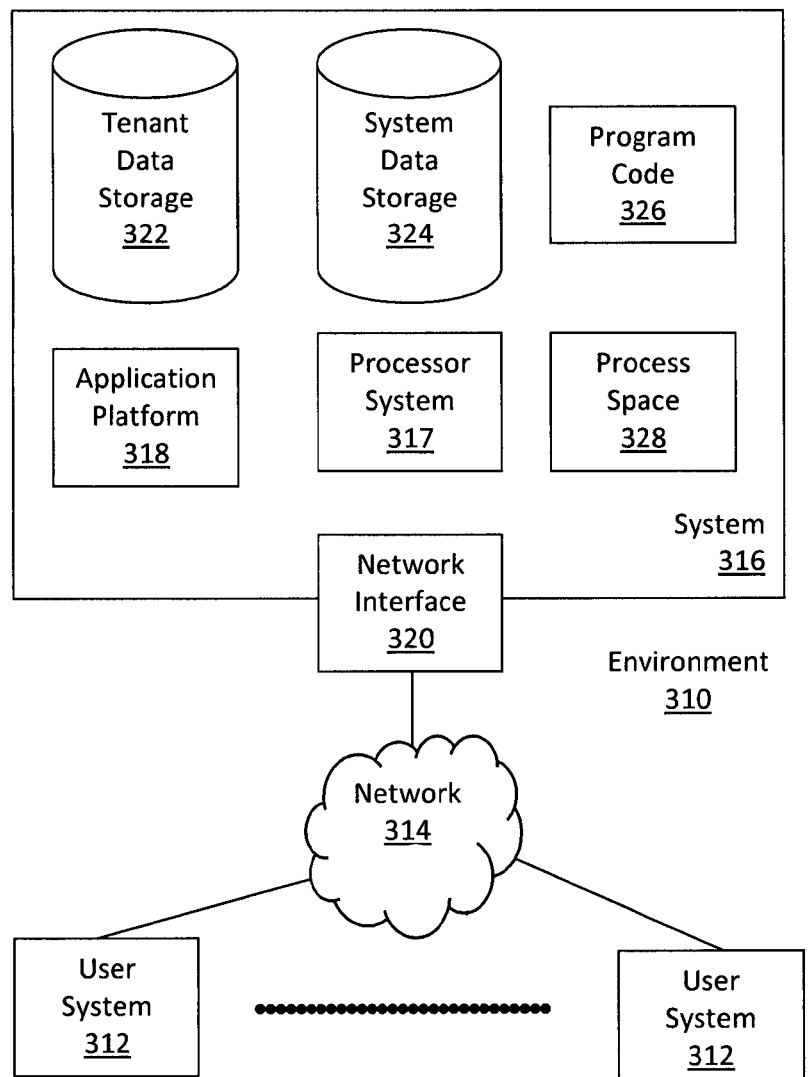
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
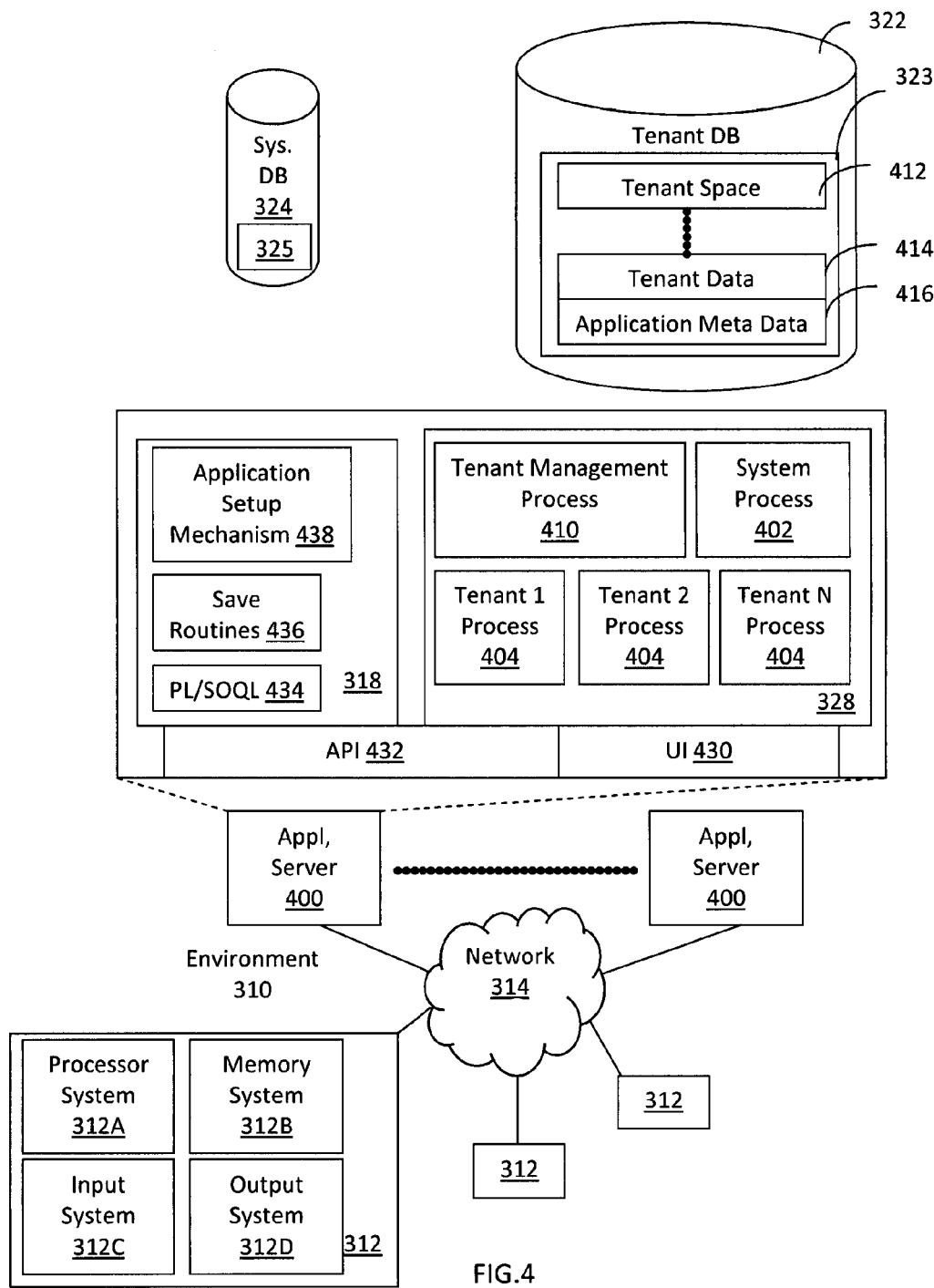
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation arid executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for semi-synchronously exporting data, the apparatus comprising:
   a processor; and
   one or more sequences of instructions stored in a non-transitory computer readable medium which, when executed by the processor, cause the processor to carry out the steps of:
      receiving, by a web server, a request for data from a client computer;
      synchronously exporting, by the web server, a portion of the requested data, accessed from a database, to the client computer in response to receiving the data request from the client computer;
      creating, by the web server, an export record after receiving the request for data from the client computer and after synchronously exporting the portion of the requested data;
      asynchronously exporting, by the web server, a remainder portion of the requested data to the client computer subsequent to the web server synchronously exporting the portion of the requested data to the client computer, the asynchronous exporting comprising:
         sending, by the web server, a token to the client computer, a receipt of the token enables the client computer to be used for other purposes while waiting for receipt of the remainder of the requested data, the token enabling the client computer to execute a process in the background of the client computer to periodically poll the web server;
         processing, by at least one of a plurality of batch processing servers, the requested data, by accessing the database, in response to accessing the export record;
         updating, by the at least one of the plurality of batch processing servers, the export record to reflect the processing of the data request; and
         exporting, by the web server, the remainder of the requested data to the client computer in response to identifying an update of the export record.

2. The apparatus of claim 1, wherein the steps further comprise:
   determining, by the web server, whether an account associated with the client computer has sufficient credit for receiving the requested data, in response to receiving the data request from the client computer; and
   sending, by the web server, options to the client computer in response to a determination that the account does not have sufficient credit for receiving the requested data, wherein the options comprise adding all of the requested data to a cart for later use, using available credit to purchase a portion of the requested data, and modifying the data request.

3. The apparatus of claim 1, wherein the synchronously exporting, by the web server, a portion of the requested data is performed until an export of the portion of the requested data reaches a threshold.

4. The apparatus of claim 1, wherein the polling of the web server enables the client computer to determine when the data request has been processed.

5. The apparatus of claim 1, wherein the steps further comprise notifying, by the web server, the client computer that the data request has been processed.

6. A non-transitory computer readable medium carrying one or more sequences of instructions for semi-synchronously exporting data, which instructions, when executed by one or more processors, cause the one or more processors to carry out the steps of:
   receiving, by a web server, a request for data from a client computer;
   synchronously exporting, by the web server, a portion of the requested data, accessed from a database, to the client computer in response to receiving the data request from the client computer;
   creating, by the web server, an export record after receiving the request for data from the client computer and after synchronously exporting the portion of the requested data;
   asynchronously exporting, by the web server, a remainder portion of the requested data to the client computer subsequent to the web server synchronously exporting the portion of the requested data to the client computer, the asynchronous exporting comprising:
      sending, by the web server, a token to the client computer, a receipt of the token enables the client computer to be used for other purposes while waiting for receipt of the remainder of the requested data, the token enabling the client computer to execute a process in the background of the client computer to periodically poll the web server;
      processing, by at least one of a plurality of batch processing servers, the requested data, by accessing the database, in response to accessing the export record;
      updating, by the at least one of the plurality of batch processing servers, the export record to reflect the processing of the data request; and
      exporting, by the web server, the remainder of the requested data to the client computer in response to identifying an update of the export record.

7. The non-transitory computer readable medium of claim 6, wherein the steps further comprise:
   determining, by the web server, whether an account associated with the client computer has sufficient credit for receiving the requested data, in response to receiving the data request from the client computer; and
   sending, by the web server, options to the client computer in response to a determination that the account does not have sufficient credit for receiving the requested data, wherein the options comprise adding all of the requested data to a cart for later use, using available credit to purchase a portion of the requested data, and modifying the data request.

8. The non-transitory computer readable medium of claim 6, wherein the synchronously exporting, by the web server, a portion of the requested data is performed until an export of the portion of the requested data reaches a threshold.

9. The non-transitory computer readable medium of claim 6, wherein the polling of the web server enables the client computer to determine when the data request has been processed.

10. The non-transitory computer readable medium of claim 6, wherein the steps further comprise notifying, by the web server, the client computer that the data request has been processed.

11. A method for semi-synchronously exporting data, the method comprising:
   receiving, by a web server, a request for data from a client computer;
   synchronously exporting, by the web server, a portion of the requested data, accessed from a database, to the client computer in response to receiving the data request from the client computer;
   creating, by the web server, an export record after receiving the request for data from the client computer and after synchronously exporting the portion of the requested data;
   asynchronously exporting, by the web server, a remainder portion of the requested data to the client computer subsequent to the web server synchronously exporting the portion of the requested data to the client computer, the asynchronous exporting comprising:
      sending, by the web server, a token to the client computer, a receipt of the token enables the client computer to be used for other purposes while waiting for receipt of the remainder of the requested data, the token enabling the client computer to execute a process in the background of the client computer to periodically poll the web server;
      processing, by at least one of a plurality of batch processing servers, the requested data, by accessing the database, in response to accessing the export record;
      updating, by the at least one of the plurality of batch processing servers, the export record to reflect the processing of the data request; and
      exporting, by the web server, the remainder of the requested data to the client computer in response to identifying an update of the export record.

12. The method of claim 11, further comprising:
   determining, by the web server, whether an account associated with the client computer has sufficient credit for receiving the requested data, in response to receiving the data request from the client computer; and
   sending, by the web server, options to the client computer in response to a determination that the account does not have sufficient credit for receiving the requested data, wherein the options comprise adding all of the requested data to a cart for later use, using available credit to purchase a portion of the requested data, and modifying the data request.

13. The method of claim 11, wherein the synchronously exporting, by the web server, a portion of the requested data is performed until an export of the portion of the requested data reaches a threshold.

14. The method of claim 11, wherein the polling of the web server enables the client computer to determine when the data request has been processed.

15. The method of claim 11, further comprising notifying, by the web server, the client computer that the data request has been processed.

16. A method for transmitting code for semi-synchronously exporting data on a transmission medium, the method comprising:

transmitting code to receive, by a web server, a request for data from a client computer;
transmitting code to synchronously exporting, by the web server, a portion of the requested data, accessed from a database, to the client computer in response to receiving the data request from the client computer;
transmitting code to create, by the web server, an export record after receiving the request for data from the client computer and after synchronously exporting the portion of the requested data;
transmitting code to asynchronously exporting, by the web server, a remainder portion of the requested data to the client computer subsequent to the web server synchronously exporting the portion of the requested data to the client computer, the asynchronous exporting comprising:
  transmitting code to send, by the web server, a token to the client computer, a receipt of the token enables the client computer to be used for other purposes while waiting for receipt of the remainder of the requested data, the token enabling the client computer to execute a process in the background of the client computer to periodically poll the web server;
  transmitting code to process, by at least one of a plurality of batch processing servers, the requested data, by accessing the database, in response to accessing the export record;
  transmitting code to update, by the at least one of the plurality of batch processing servers, the export record to reflect the processing of the data request; and
  transmitting code to export, by the web server, the remainder of the requested data to the client computer in response to identifying an update of the export record.

17. The method for transmitting code of claim 16, further comprising:
  transmitting code to determine, by the web server, whether an account associated with the client computer has sufficient credit for receiving the requested data, in response to receiving the data request from the client computer; and
  transmitting code to send, by the web server, options to the client computer in response to a determination that the account does not have sufficient credit for receiving the requested data, wherein the options comprise adding all of the requested data to a cart for later use, using available credit to purchase a portion of the requested data, and modifying the data request.

18. The method for transmitting code of claim 16, wherein the transmitting code to synchronously export, by the web server, a portion of the requested data is performed until an export of the portion of the requested data reaches a threshold.

19. The method for transmitting code of claim 16, wherein the polling of the web server enables the client computer to determine when the data request has been processed.

20. The method for transmitting code of claim 16, further comprising transmitting code to notify, by the web server, the client computer that the data request has been processed.

* * * * *